Nov. 16, 1926.  
F. W. STROSCHEIN  
GATE  
Filed April 14, 1926
1,607,021
Fig. 1.
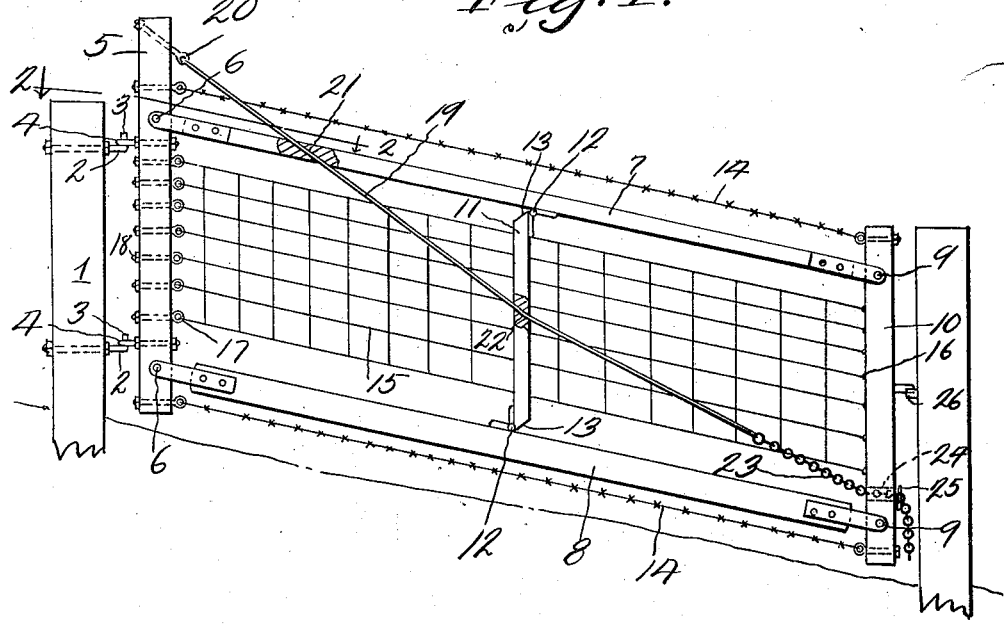
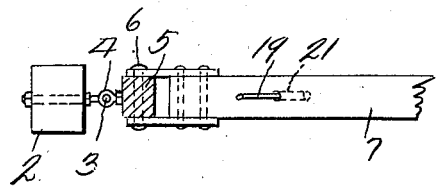
Fig. 2.
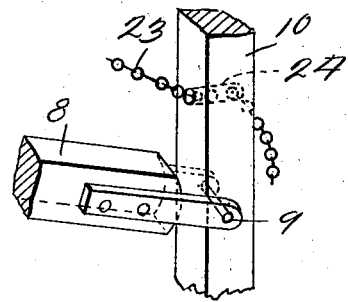
Fig. 3.
Inventor  
F. W. Stroschein  
By Philip A. H. Sewell  
Attorney Patented Nov. 16, 1926.

1,607,021

UNITED STATES PATENT OFFICE.

FREDRICK W. STROSCHEIN, OF STERLING, IDAHO.

GATE.

Application filed April 14, 1926. Serial No. 101,943.

The invention relates to gates, and has for its object to provide a device of this character comprising vertically disposed end bars connected together adjacent their upper and lower ends by rails, the ends of which are pivotally connected to the end bars, thereby allowing a movement of the gate structure in a vertical plane in a manner whereby all of the bars will be maintained in parallel relation, thereby allowing the gate to be used on an incline if desired.

A further object is to provide a vertically disposed center bar in parallel relation to the end bars and hingedly connected to the upper and lower bars, and forming a brace for the center of the gate.

A further object is to provide a brace wire connected to the upper end of the end bar adjacent the hinging point of the gate and inclining downwardly and through an aperture in the hinged brace bar and terminating in a chain extending through an aperture in the end bar of the gate adjacent its lower end and adapted to receive therein a pin whereby the gate may be adjusted to different elevations, for instance high enough in relation to the ground to allow passage of fowl, but to prevent passage of animals.

A further object is to provide the gate with a wire mesh, the horizontal strands of which are anchored to eye bolts carried by the vertically disposed bar at the hinged end of the gate and to the vertically disposed bar at the free end of the gate.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a view in elevation of the gate.

Figure 2 is a detail sectional view taken on line 2—2 of Figure 1.

Figure 3 is a detail perspective view of a portion of the vertically disposed bar at the free end of the gate showing the chain receiving aperture therein.

Referring to the drawing, the numeral 1 designates a gate post which is provided with L-shaped lugs 2, the vertical portions 3 of which extend through eyes of eye bolts 4 of the vertically disposed end bar 5 of the gate, thereby forming hinges whereby the gate may be moved to open position from either side thereof and in opposite directions. Hingedly connected at 6 to the end bar 5 adjacent its upper and lower ends are top and bottom rails 7 and 8 of the gate, the ends of which are hingedly connected at 9 to the vertically disposed bar 10 at the free end of the gate. It will be noted that bars 5 and 10 are in parallel relation to each other as well as the bars 7 and 8, therefore it will be seen when the free end of the gate is lifted or adjusted to different elevations, said bars and rails will be maintained at all times in parallel relation. Disposed between the rails 7 and 8 intermediate their ends is a vertically disposed brace bar 11, which brace bar is hingedly connected at 12 to the adjacent sides of the rails 7 and 8, and at the same time is in parallel relation to the bars 5 and 10, it will allow free vertical movement of the free end of the gate, however the bar 11 is preferably bevelled at 13, so it will not interfere with the parallel movement of the rails 7 and 8 when the free end of the gate is raised to a point where the gate as a whole will incline upwardly which is desirable in some cases, where the gate is used on an incline. Strands of barbed wire 14 are preferably provided above and below the rails 7 and 8 and the lower strand of barbed wire prevents animals from forcing their way under the gate or attempting to raise the gate, and a wire mesh 15 is provided for closing the central portion of the gate, and which wire mesh is anchored at 16 to the bar 10 and at 17 to eye bolts 18 carried by the bar 5, therefore it will be seen the wire mesh will not interfere with the movement of the gate as its strands are in parallel relation to the movable parts of the frame of the gate.

To brace and support the gate in various adjusted positions brace wire 19 is provided which brace wire is anchored at 20 to the bar 5 adjacent its upper end and extends downwardly and inclines towards the lower free end of the gate through the aperture 21 in the upper rail 7, the aperture 22 in the brace bar 11 and has connected thereto a chain 23 which extends through an aperture 24 in the end bar 10, and through any of the links of which a pin 25 may be placed for holding the gate at various adjusted positions. In adjusting the gate the operator grasps the free end thereof and lifts the same to the desired elevation and after which the pin 25 is passed through the proper link of the chain. It will be noted by passing the brace wire 19 through the apertures 21 and 22, there is a bend in the wire downwardly, which bend exerts a lifting action on the center of the gate and prevents sagging of the same centrally which is a common difficulty now experienced with gates of this general character. A conventional form of latching means 26 is provided, however it is to be understood any kind of latch may be used, and applicant does not limit himself in this particular.

From the above it will be seen that a gate is provided which is simple in construction, the parts reduced to a minimum, and one which may be cheaply manufactured and sold. It will also be seen that the gate is positively braced and trussed by the wire 19 at spaced points intermediate its ends, thereby preventing sagging of the gate centrally, and by adjusting the chain 23, the gate may be adjusted to various inclinations above or below a horizontal position.

The invention having been set forth what is claimed as new and useful is:—

A gate comprising vertically disposed end bars in parallel relation, parallel upper and lower rails hingedly connected to the end bars adjacent their upper and lower ends, a vertically disposed brace bar connecting the rails and hingedly connected to the adjacent sides thereof, the ends of said brace bar being cut away, a support, one of said end bars being hingedly connected to the support, a brace wire connected to the end bar adjacent the hinging point of the gate, said brace wire extending downwardly through apertures in the upper rail and the brace bar and inclining towards the free lower corner of the gate, said brace wire having connected thereto a chain, said chain extending through an aperture in the end bar at the free end of the gate, and a member extending through said chain and engaging the outer side of said last named end bar.

In testimony whereof I hereunto affix my signature.

FREDRICK W. STROSCHEIN.